Nov. 26, 1946.  O. S. CARLISS  2,411,521

DIAL HEAD UNIT FOR WEIGHING AND RECORDING SCALES

Filed Nov. 24, 1941  3 Sheets-Sheet 1

INVENTOR
Oswald S. Carliss
BY
ATTORNEY

Nov. 26, 1946.  O. S. CARLISS  2,411,521
DIAL HEAD UNIT FOR WEIGHING AND RECORDING SCALES
Filed Nov. 24, 1941  3 Sheets-Sheet 2
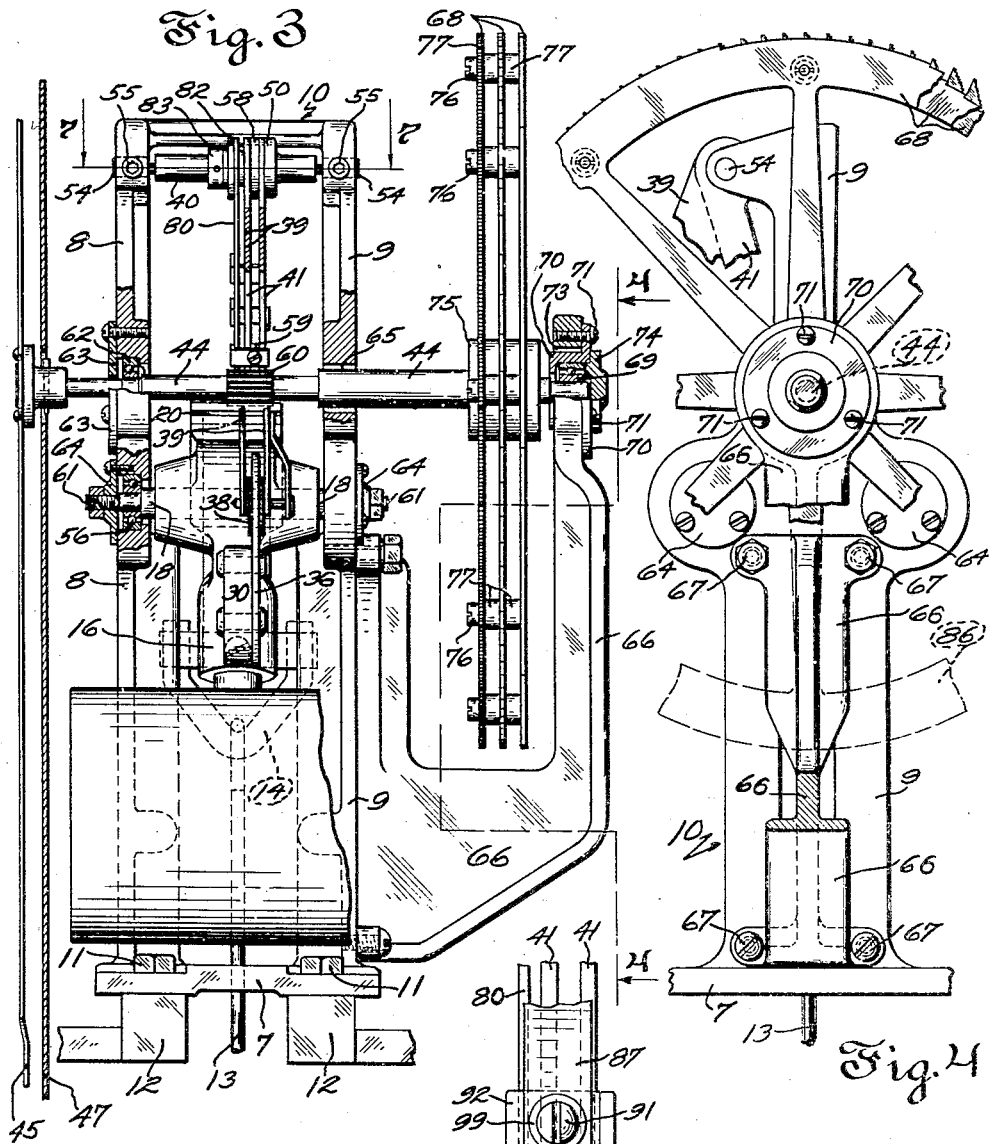
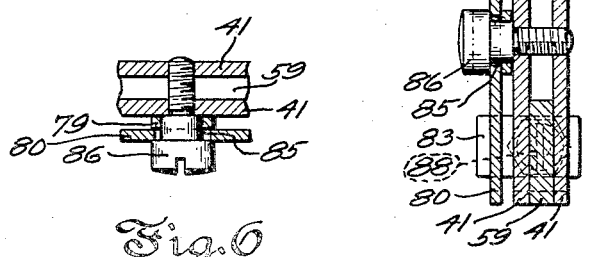
INVENTOR
Oswald S. Carliss,
BY
ATTORNEY

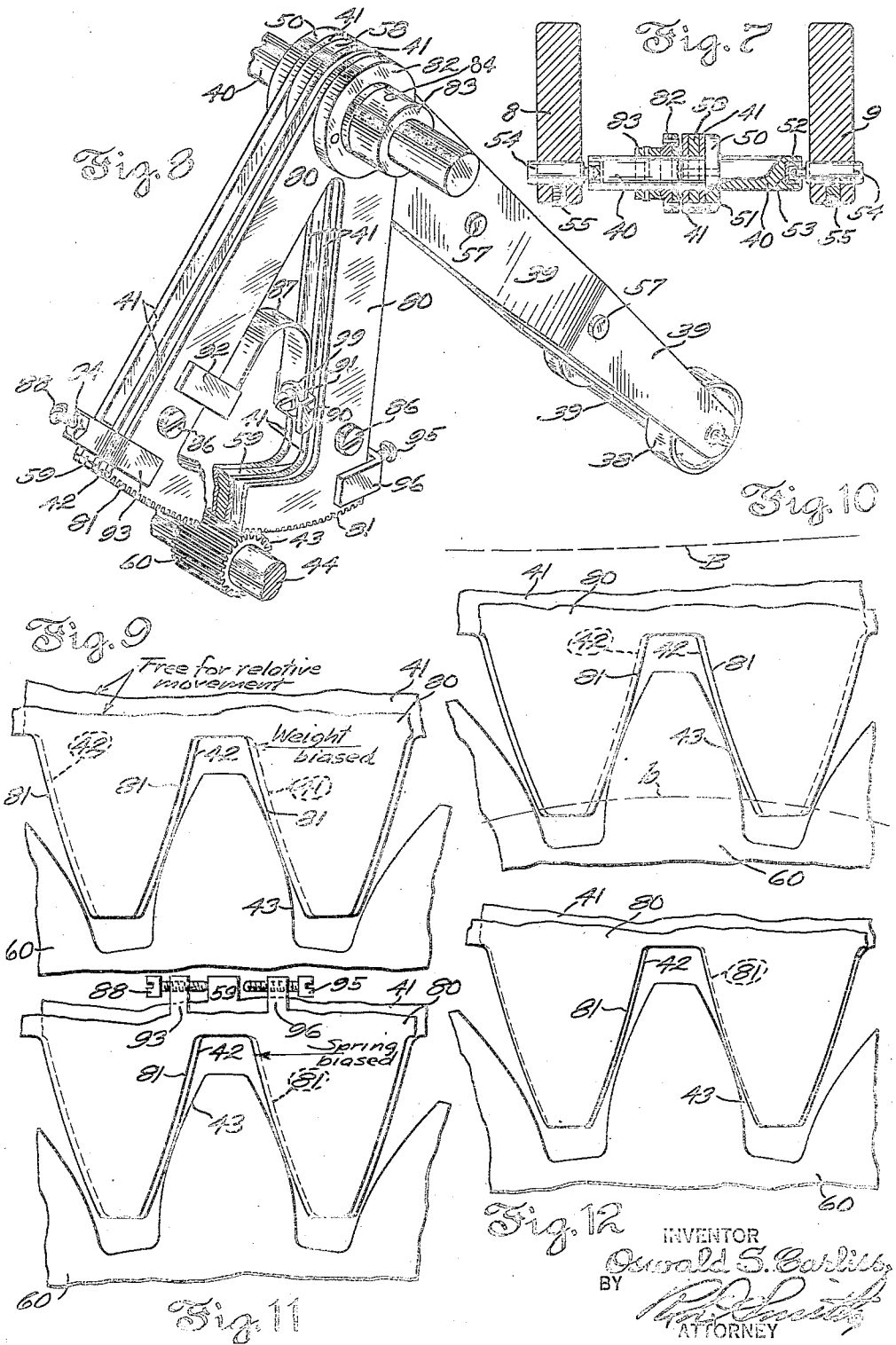

Patented Nov. 26, 1946

2,411,521

UNITED STATES PATENT OFFICE 2,411,521

DIAL HEAD UNIT FOR WEIGHING AND RECORDING SCALES

Oswald S. Carliss, Fairfield, Conn., assignor, by mesne assignments, to The Yale & Towne Manufacturing Company, Stamford, Conn., a corporation of Connecticut Application November 24, 1941, Serial No. 420,208

10 Claims. (Cl. 265—62)

1

This invention relates to load counterbalancing and weight indicating mechanism sometimes incorporating physically graduated devices such as peripherally stepped discs adapted to be sensed by feeler fingers for positioning weight recording type in correspondence with different positions of a visual weight indicator. The present improvements further relate in part to mechanism in a weighing scale which serves to transmit motion from such load counterbalancing mechanism to such weight indicator and/or such stepped discs.

While the present improvements are not limited to incorporation within automatic weighing scales they may be embodied in such and are herein disclosed with reference to a particular type of dial head unit more fully disclosed in United States Patents No. 2,083,413, granted June 8, 1937, and No. 2,173,746, granted September 19, 1939. Structure disclosed but not claimed herein is claimed in my copending application, Serial No. 478,355, now Patent No. 2,354,301, granted July 25, 1944.

In industrial weighing scales it is a useful and common practice so to radially elongate the weight indicating pointer that the pointer end performs a relatively large extent of linear movement corresponding to tiny increments of angular movement of the pointer and corresponding to the even smaller increments of angular movement of the load counterbalancing pendulums. A considerable further magnification of the movement of the pointer end responsive to the pendulum movement is usually accomplished by means of a motion multiplying gear set or transmission.

It is an object of the present invention so to construct a light duty, movement multiplying, gear type of transmission mechanism for translating relatively tiny displacements of load counterbalancing mechanism into proportionally large linear travel of a weight indicator, that play or backlash between intermeshed gear and pinion teeth shall be entirely eliminated and in a manner to prevent all quivering of the observed end of the indicator pointer. Very objectionable quivering at this point has heretofore been occasioned by vibrations to which weighing scales are subjected in industrial plants because such vibrations unavoidably become transmitted to the framework of the dial head unit.

A further object is to eliminate such play or backlash by the use of yieldable devices making unnecessary either perfection or very minute tolerances in the shape and dimensions of the gear teeth employed, and which devices will admit of considerable error and irregularity in the cutting and finishing of gear teeth as well as in tightness

2 of bearings and in the center distance between axes about which intermeshed gear members revolve.

A still further object is to provide backlash eliminating means which act resiliently in a manner to govern the cooperative action of a pinion and gear in the transmission mechanism. A related object is to introduce such resilience in a manner to defeat all tendencies to looseness, shaking and impacting of intermeshed gear teeth arising from automatic reaction of the mechanism to any periodicity of vibration which may be imparted thereto through the framework of the dial head unit.

A still further object is to modify the operative effect of the before mentioned resilient means by employing one or more movement arresting stops in a way adjustively to restrict play and prevent oscillatory impacts between gear teeth, due to frame vibration, which otherwise could take place between cooperative engageable surfaces of respectively intermeshed gear members.

The foregoing and other related objects of the invention will appear in greater particular from the following description of a practical embodiment of the invention which refers to the accompanying drawings and serves to illustrate certain principles that may be incorporated in various embodiments of the invention.

All figures of the drawings which show parts in section are views looking in the direction of the arrows which designate the several numbered section planes.

In the drawings:

Fig. 3 is an edgewise view looking from the right toward Fig. 1 showing some of the structure cut away better to expose parts in which the improvements particularly reside.

Fig. 4 is a fragmentary view of the dial head unit in rear elevation showing parts of the frame structure in section on planes 4—4 in Fig. 3.

Fig. 5 is a fragmentary view drawn on the same scale as Fig. 2 taken in section on the planes 5—5 in Fig. 1.

Figure 1:
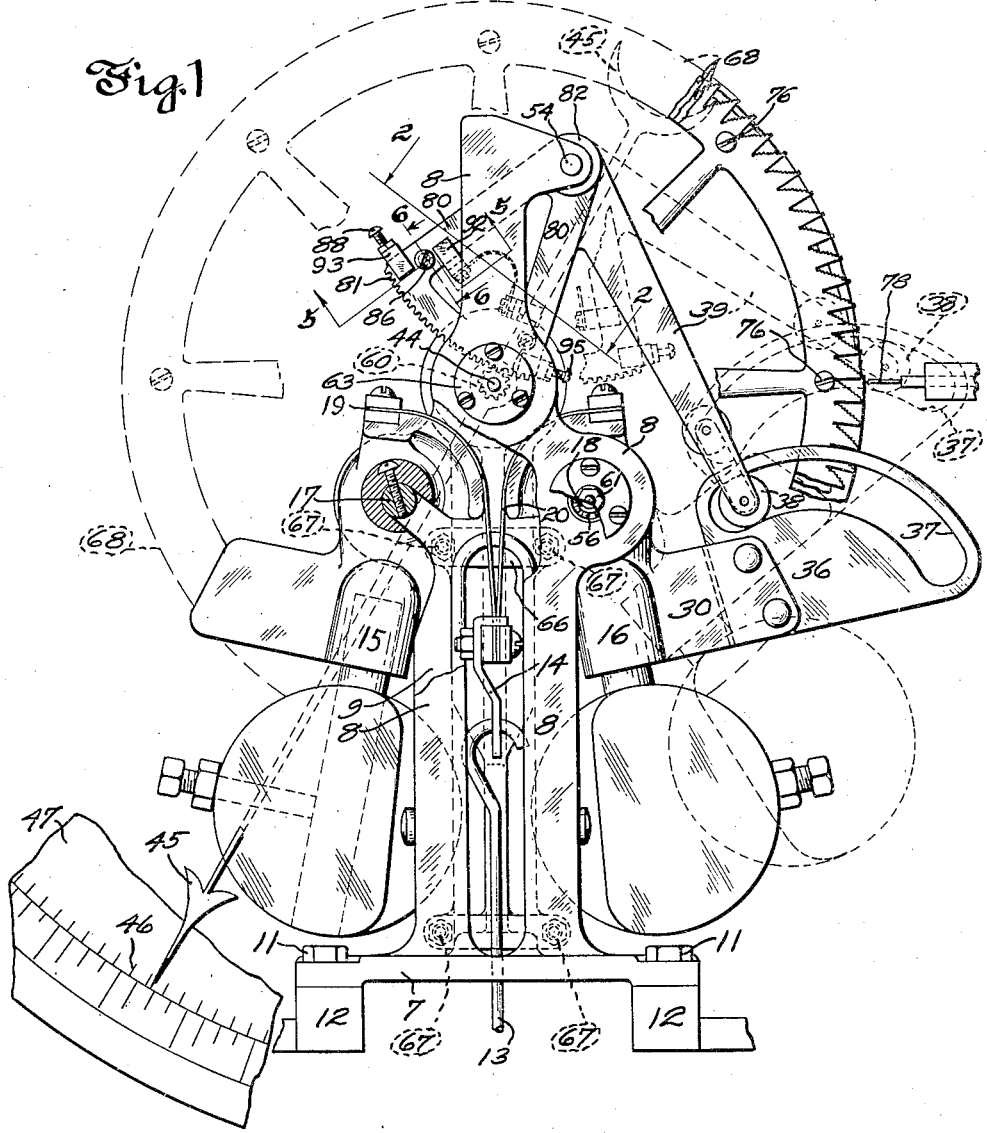
Fig. 1 is a front elevation of the dial head unit of a weighing scale embodying the present improvements and incorporating stepped discs to be sensed in the recording of weight values.
Figure 2:
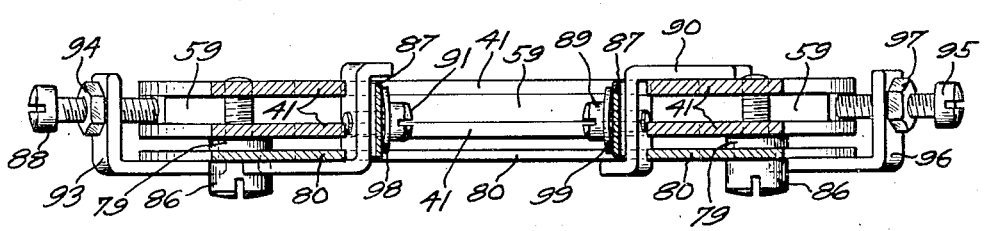
Fig. 2 is a fragmentary view drawn on an enlarged scale taken in section on the plane 2—2 in Fig. 1.

Fig. 6 on a similar scale is a view taken in section on plane 6—6 in Fig. 1.

Fig. 7 is an enlarged view taken in section on the plane 7—7 in Fig. 3.

Fig. 8 is an enlarged isometric view of intermeshed gear members which motivate the pointer spindle.

Figs. 9 and 10 illustrate on a greatly enlarged scale formerly objectionable conditions in the coaction of the gear teeth.

Figs. 11 and 12 illustrate the coaction of gear teeth as improved by this invention.

Portions of the dial head unit of Figs. 1, 3 and 4 may be like corresponding parts disclosed in U. S. Patent No. 2,083,413 and will therefore be designated by similar reference numerals. A skeleton cast metal frame indicated as a whole by 10 includes front and rear frame walls 8 and 9 upstanding from and rigid with a common base structure 7, the latter being mounted by means of bolts 11 on any suitable support 12 which may constitute the header of a scale column of the type commonly associated with a depressible platform or other weight responsive receptacle adapted to support a weighable load. Such column and platform are not herein shown, it sufficing to mention that the weighable load exerts a downward force on draft rod 13 which is suspended by means of its hooked upper end from a V-shaped coupling loop 14.

Front and rear walls 8 and 9 flank respectively opposite sides of pendulums 15 and 16. These pendulums act jointly to counterbalance the pull of the load on draft rod 13 and are mounted respectively on trunnion-like bearing shafts 17 and 18 and jointly support the coupling loop 14 by means of flexible suspension straps 19 and 20, respectively.

Shafts 17 and 18 are rotatably supported and held antifrictionally to a fixed axis of rotation despite all shocks and vibrations by means of ball bearings 56 which are removably embedded in and supported by each of the spaced upright walls 8 and 9. In accordance with the construction proposed in the aforesaid Patent 2,083,413, dirt may be excluded from each of ball bearings 56 by means of a removable cover cap 64. Each such cap is penetrated by a cone pointed adjustable screw 61 which takes the end thrust of the pendulum shaft.

Pendulum 16 carries a fin 36 and plate 36 containing slot 37 along which freely rides the roller 38. This roller is pivotally carried at the end of an arm 39 of a main sector whose hub portion is fixed to flange 50 on sector shaft 40 by means of pins 51 as best shown in Fig. 7. Each end of shaft 40 contains a center recess which is lined by a hardened bushing 52 backed by a hardened thrust disc 53. A pintle 54 is lodged coaxially with shaft 40 in each of the front and rear walls 8 and 9 and is longitudinally adjustable therein when set screw 55 is loosened. The diameter of the cone pointed end of each pintle 54 which takes the end thrusts of shaft 40 has a slip fit in relation to the inside diameter of bushing 52 so that shaft 40 is entirely free to turn but is permitted no diametrical looseness nor play.

The sector is composed of similar laterally spaced laminae 41 which are secured fixedly together to act as an integral mechanical part by means of suitable spacers and rivets 57. One of these spacers may comprise a hub washer 58 while other spacers (not shown) serve to separate the arm portions of the sector laminae at the location of the rivets 57 therein. Along its arcuate margin the sector laminae 41 carry fixedly sandwiched therebetween the correspondingly shaped arcuate bar 59. Gear teeth 42 are cut crosswise in the combined peripheral edges of laminae 41 and bar 59 which teeth thus have a length equal to the combined thicknesses of said laminae and bar.

Teeth 42 of the main sector gear 39 mesh with teeth 43 of a pinion 60 cut in a pinion blank which may be an integral part of the indicator spindle 44 intermediate its length. This spindle protrudes at the front of wall 8 as shown in Fig. 3 and thereat carries fixedly the weight indicating pointer 45 in a position so that the arrow-pointed end of the latter sweeps over the weight graduations 46 marked on dial 47 which dial is stationary with frame 10. Close to pointer 45 spindle 44 is supported sturdily and antifrictionally in ball bearing 62 embedded in wall 8 and protected by the dust cap 63 which contains a clearance hole freely accommodating spindle 44.

Spindle 44 passes freely through a clearance hole 65 in the rear wall 9 and, at a location spaced substantially rearward of rear wall 9, is given anti-frictional bearing in a U-shaped rigid bracket 66 fixedly and removably secured to the rear wall 9 by bolts 67. The U-shape of bracket 66 accommodates the full diameter of a series of stepped discs 68 which could not be placed between the walls 8 and 9 because such discs when desirably large to afford room for one thousand individual steps about the periphery would interfere with pendulum shafts 17 and 18. In other words the axes of the pendulum shafts if projected must intercept these discs if the disc diameter is made desirably large. A reduced rear end portion of spindle 44 is rotatably supported in a ball bearing 69 whose outer race may be lodged with a nice fit directly in the hole 73 which is bored through bracket 66 but is herein shown as lodged in a diametrically adjustable cup 70 having a peripheral flange adjustable secured to bracket 66 by screws 71 occupying oversized holes through this cup flange. This construction permits corrective variation of the centralization of ball bearing 69 relative to bracket 66 so that the former may be mounted in exact axial alignment with bearing 62 irrespective of any small inaccuracy in the dimensions of bracket 66 or in its positioning on frame wall 9.

The stepped discs 68 may be like those designated as 29, 30 and 31 in U. S. Patent No. 2,173,746 and may be held together in a unitary bank by being mounted on a common hub 75 fixed to spindle 44 and by being joined in axially spaced fixed relation by screws 76 and separator collars 77 at points near their peripheries. In Fig. 1 the location of one of a line of blade-like members 78 is indicated which may serve as feelers to sense the various steps of discs 68 which, by revolving to a position opposite such feelers, determine what weight will be recorded in a well known manner. An example of the action of such feelers is given in greater particular in U. S. Patent No. 2,198,139.

The step sensing thrust exerted by such feelers 78 and directed radially toward the spindle 44 may tend to deflect this spindle eccentrically if the latter is not firmly supported for free rotation at a point in its length near the carried discs. The minuteness of the step dimensions on disc 68 would cause such deflection to result in inaccurate recording of weight. Such deflection is completely eliminated by these improvements by extending the length of spindle 44 so that both ends of the spindle are journaled in ball bearings on respectively opposite sides of the stepped discs. Also the spindle is given anti-friction rotary support close to the stepped discs even though the latter are of desirably large diameter to preclude their being located between frame walls 8 and 9.

Coming now to further improvements which cooperate with the before described novel features of construction attention is particularly directed to Figs. 5 to 12, inclusive, wherein are disclosed novel expedients for eliminating backlash between the combined sector teeth and the pinion teeth so that these teeth become nontranslative of vibrations set up in the frame of the dial head unit as a whole. This prevents such vibration from setting up objectionable quivering or trembling of the pointer 45 or of the steps of disc 68 when the pointer is at zero position as well as when some measure of weight is being indicated thereby.

Vibration of high and varying frequency develops to be particularly troublesome in automatic weighing scales when used in connection with engine testing dynamometers. There are other industrial operations, as for example in pug mills, where massive bodies are subjected to strong vibratory forces because reciprocated or rotated at high speed or while poorly balanced. When subjected to such vibration transmitted through framework of the weighing scale or otherwise, any uncontrolled backlash between gear teeth 42 and pinion teeth 43 causes violent quivering of pointer 45 and this takes place simultaneously in the stepped discs through spindle 44 thus impairing both the readability of the pointer indication and the ability to obtain an accurate recording of weight. Heretofore, in attempts to take care of such conditions, an auxiliary toothed sector has been employed meshing with the same pinion teeth 43 as does main sector 41 but constantly urged in a single direction of rotation with respect to frame 8 by means of a free floating offset weight intended automatically to take up play between teeth. This former type of auxiliary sector in which a moment of torque is set up continually by the pull of gravity on an offset weight develops at times to cause even more pronounced quivering and objectionable trembling of the indicator pointer 45, spindle 44 and of stepped discs 68 than would be the case without the play eliminating weight.

The present improvements provide backlash elimination by the use of an auxiliary sector 80 having teeth 81 which may be identical in dimensions and shape of working faces with the teeth on main sector 41 and which may be turnable concentrically therewith and relative thereto but only within limits of movement that is automatically resisted and controlled by a novel combination of resilient means and stop means. This resilient means is arranged to exert upon the weight indicator a constant unidirectional bias that is derived not from the stationary framework but from the main sector which itself is motivated by the vibration sensitive weighing pendulum of the scale. This makes the pointer spindle incapable of being agitated by periodicities of vibration which in former attempts at vibration absorption have left a weight biased auxiliary sector free to set up hammering effects between intermeshed gear teeth.

The auxiliary sector 80 of these improvements is fixed on a hub 82 which flanks main sector 41 on shaft 40 being freely rotatable on the latter and axially constrained thereon by the thrust collar 83 fixed on shaft 40 as by pin 84. Figs. 5 and 6 show that auxiliary sector 80 is provided with two elongated arcuate slots 85 each occupied by a shoulder screw 86 the end of which has threaded engagement with main sector 41 and the head of which limits axial separation of sector 80 from sector 39. A loose spacer washer 79 surrounds screw 86 between sector 41 and 80. Slots 85 permit a degree of limited swinging movement of sector 80 relative to sector 41 which movement is operatively restricted and controlled by a bowed leaf spring 87 in conjunction with one or more adjustable stop screws 95, 88. Spring 87 has one end secured by a screw 89 and lock washer 99 to an angle bracket 90 which is fixed on main sector 41 and free from auxiliary sector 80 while the other end of spring 87 is secured by screw 91 and lock washer 98 to an angle bracket 92 which is fixed on the auxiliary sector 80 and free from main sector 41. The adjustable stop screw 88 is in threaded engagement with and carried by an angle bracket 93 fixed on auxiliary sector 80 and is locked by the nut 94. Another adjustable stop screw 95 is in threaded engagement with and carried by an angle bracket 96 fixed on auxiliary sector 80 and is locked by the nut 97. Both stop screws 88 and 95 present their inner ends toward the opposite edges respectively of sector bar 59 and thereby serve to regulate to a finely adjustable degree not only the maximum scope or range of relative movement between sectors 41 and 80 but also the placement of said range of movement, that is to say, the permissible direction and extent of departure of a given auxiliary sector tooth 81 from a position of exact register in true flanking alignment with a given main sector tooth 42 of like shape and size.

While the shape and size of the teeth 42, 43 and 81 hereinbefore mentioned may be modified widely and still incorporate the principles underlying this invention, such teeth will preferably be of true involute shape and for purpose of illustration may be assumed to have the following dimensions.

|  | Specifications of pinion 60 | Specifications of main sector 41 and auxiliary sector 30 |
| --- | --- | --- |
| Pitch diameter ............. inches.. | .500 | 6.666 |
| No. teeth ....................... | 24 | 320 |
| Diameter of base circle ............ | .462 | 6.159 |
| Diameter of root circle ............ | .452 | 6.618 |
| Pressure angle ........... degrees.. | 22½ | 22½ |
| Distance between centers ............ | 3.588 | |

In the above table and as diagrammed in Fig. 10 it will be observed that the base circle (B) of the gear teeth on the main and auxiliary sectors falls considerably inside radially of the root circle passing through the radially innermost or root ends of the working surfaces of sector teeth 42 and 81, whereas the base circle (b) of the pinion teeth 43 is as large as is the root circle passing through the radially innermost or root ends of the working surfaces of the pinion teeth 43, the working surface of each tooth being that portion of the entire tooth length capable of contacting with any intermeshed tooth. I may cut the teeth 42 and 81 on each of the sectors in conventional manner, that is to say, providing the same width for the tooth along the pitch circle as is possessed by the space between adjacent teeth on the same pitch circle. However, in order to prevent possibilities of binding at any point between the intermeshed teeth occasioned by minute irregularities that are bound to occur in the tooth cutting process, I prefer to cut the teeth 43 of the pinion so that the width of the tooth along the pitch circle is .005" less than is the width of the space between teeth 42 along the same pitch circle. This provides a designed .005" non-adjusted structural clearance or play or lost motion between each pinion tooth 43 and the adjacent main sector teeth 42, 42 in Figs. 11 and 12 as well as between said pinion tooth 43 and the adjacent auxiliary sector teeth 81, 81.

In order to take up this play automatically there has heretofore been proposed a gravity means for biasing auxiliary sector 80 relative to frame 8 constantly toward the left in Figs. 9 and 10, such gravity means taking the form of a weight on an arm (not herein shown) fixed to swing in unison with auxiliary sector 80. Elongated slots like 85 have heretofore permitted full freedom of the auxiliary sector teeth 81 to move relatively to main sector teeth 42 from their position in Fig. 10 to their position in Fig. 9 responsively to the biasing effect of such weighted arm. Referring still to Figs. 9 and 10, we will assume that under these old conditions, play or backlash was permitted amounting to .005" relative movement between pinion tooth 43 and main sector teeth 42 as well as between pinion tooth 43 and auxiliary sector teeth 81. This, however, would permit .010" relative movement between auxiliary sector teeth 81 and the main sector teeth 42 or the sum of the individual clearances of .005" which the teeth of each sector have relative to the pinion tooth. Under these conditions vibration imparted to spindle 44 through its bearings in the frame 8 of dial head mechanism 10 has been found to set up periodic oscillation resulting in mutually impacting action of teeth 43 and 81 as they shake back and forth between their positions in Figs. 9 and 10 with respect to each other and with respect to main sector teeth 42, the latter being tremulously ballasted by pendulum 16. Resulting rapid and minute oscillation of spindle 44 causes the indicator end of pointer 45 to vibrate with respect to the scale graduations 46 to an extent making it difficult or impossible to read accurately the indication of weight. At the same time stepped discs 68 would vibrate in unison with the pointer through an arc greater than the circumferential width of one of the peripheral steps thereon so that sensing feeler 78 could engage with an incorrect step on one of the discs 68 and thus make an erroneous record of weight.

To obviate such difficulties the present improvements do away with use of the gravity effect of an offset weight as an attempted expedient for dampening periodic response of the indicator pointer to frame vibration, and introduce instead a bowed spring 87 deriving thrust from main sector 80 for setting up a constant unidirectional torque urging auxiliary sector 80 always clockwise in Figs. 1 and 8 with respect primarily, not to the frame 8 as in the aforementioned Patent 2,083,413, but only relative to main sector 41. Also the permissible range of the biased relative movement of the auxiliary sector teeth 81 is newly restricted by these improvements both in extent and as to its placement toward the right and/or toward the left in Figs. 11 and 12 in relation to main sector teeth 42. These newly devised limitations of movement will be explained with particular reference to Figs. 11 and 12.

Fig. 11 shows the normally biased relationship of the teeth corresponding to Fig. 9. Fig. 12 shows that instead of auxiliary sector teeth 81 being permitted a full .010" of unrestricted displacement from the position in Fig. 11 assuming pinion 60 free to be turned, the auxiliary sector teeth 81 by these improvements are restricted by stop screw 88 to a less displacement of .003" relative to main sector teeth 42 from the position in Fig. 11. That is to say, the tooth face 81 is never permitted to pass by tooth face 42 even though pinion 60 is free to be turned. Comparison of Figs. 11 and 12 will make clear that this reduces the maximum backlash between a pinion tooth 43 and the combined adjacent teeth of both sectors from .005" in Figs. 9 and 10 to .003" in Figs. 11 and 12.

In practice, the sector gears of Fig. 8 will first be assembled with the stop screws 88 and 95 sufficiently retracted to free auxiliary sector 80 for its fullest extent of movement relative to main sector 41 permitted by the individual size and shapes of the teeth of the sectors and the intermeshing teeth of the pinion (designed to be .005"). Screw 88 will then be closed in toward the arcuate end of sector 41—59 as far as is possible without causing any bind over the entire arc of operative swinging movement of both the main and auxiliary sectors while these sectors jointly mesh with pinion 60. This setting of screw 88 will then be locked by nut 94 and may result as indicated in Fig. 10 in reducing the maximum unrestricted lost motion of .005" to a restricted or operative lost motion of .003" between pinion teeth 43 and the combined teeth 81 and 42 of the main and auxiliary sectors. It will be understood from the description hereinbefore shown that spring 87 yieldingly takes up this reduced lost motion in a manner to keep, or tend to keep, each working face of a given pinion tooth 43 in contact respectively and simultaneously with a working face of both a main sector tooth 42 and an auxiliary sector tooth 81 as shown in Fig. 11.

If, however, there should be no vibrational forces at work tending to separate these contacting faces of teeth 43 from faces of teeth 42 and 81 despite frame tremors that may be taking place, there still may arise in the auxiliary sector 80, itself, a tendency to shake responsively to such tremors. This tendency could urge a mere weight biased auxiliary sector tooth 81 to perform lost motion relative to stationary pinion tooth 43. At each movement of tooth 81 toward the left in Fig. 11 during this lost motion, the moving tooth would impact pinion tooth 43 and possibly cause the latter to rebound from main sector tooth 42 with which tooth 43 might otherwise rest idly in contact. Obviously stop screw 88 alone is ineffective to prevent tooth 81 from hammering tooth 43 toward the left and against tooth 42 in Fig. 11 but the additional stop screw 95 can be set up and come into play to prevent such lost motion hammering from causing a quivering of the indicator spindle which otherwise might result therefrom. If stop screw 95 is turned in toward the arcuate end of sector 41—59 and locked by nut 97 in a position to check any movement of auxiliary sector tooth 81 toward the left beyond its full line position shown in Fig. 11, the disturbing impact of tooth 81 against tooth 43 is prevented or at least lessened with consequent elimination of tendency of tooth 43 to be caused thereby to rebound from tooth 42.

Thus in the construction herein novelly provided there are safeguards against several different kinds and periodicities of vibration which otherwise under varying conditions of industrial weighing might produce quivering of indicator pointer 45 and of stepped discs 68 if one or more of the elements of the above described improved construction were omitted.

Starting with the parts positioned as in Fig. 1, in a weighing scale incorporating these improvements, the pull of a weighable load on 13 swings pendulum 16 counterclockwise about its antifriction bearing 56 whereupon roller 38 follows cam slot 37 resulting in counterclockwise swinging of the composite sector gear 80—41 to weighing position. Pinion 60 will thereupon be impelled clockwise together with spindle 44, its carried pointer 45 and stepped discs 68 through the medium of the backlash absorbing spring 87. Pointer 45 will indicate the weight without trembling due to entire elimination or material reduction of backlash between all intermeshed gear teeth in the transmission mechanism as heretofore explained. The stepped discs 68 are not only thus protected against backlash but are further protected from disturbance by eccentric deflection of spindle 44 because this spindle is sturdily supported at its extreme end in the close neighborhood of discs 68 by the antifriction bearing 69. This bearing is carried in the newly provided removable frame bracket 66 which enables discs 68 to be of sufficiently large diameter to reduce the likelihood of errors resulting from any slight deviation from true position of the correspondingly larger steps of the disc which are sensed and pressed against by feelers 78 to determine what weight shall be recorded.

Thus an improved dial head mechanism for a weighing scale is provided whose accuracy in indicating and recording weight is materially increased and also made immune to many troublesome effects of vibrations heretofore encountered while weighing loads in localities where heavy vibration of industrial operations reach the scale.

The disclosure hereof will be suggestive of many modifications that can be resorted to in practicing the underlying principles of the invention, and hence the appended claims will be understood as directed to and intended to cover all known substitutes and equivalents for the particular parts, arrangements and functions herein disclosed.

I claim:

1. In a weighing scale a light duty movement multiplying transmission for translating the relatively small displacements of a weighable load counterbalancing mechanism into respectively greater corresponding displacements of a weight indicator embodying the combination with said load counterbalancing mechanism of, pinion teeth connected to actuate the weight indicator, main gear teeth connected to be actuated by the load counterbalancing mechanism meshing with and so cooperatively related in shape and size to said pinion teeth that bind preventing play is present between all intermeshed teeth despite dimensional diversity thereof, auxiliary gear teeth in mesh with said pinion gear teeth, means independent of said pinion teeth restricting said auxiliary gear teeth to limited play in their pinion driving path of movement between predetermined spaced positions relative to said main gear teeth, and resilient means connected to derive thrust from said main gear teeth and transmit said thrust to said auxiliary gear teeth in a manner to urge the latter constantly toward one of said predetermined positions relative to said main gear teeth thereby to cause at least one of said auxiliary gear teeth to urge one of said pinion teeth constantly against one of said main gear teeth.

2. In a weighing scale, the combination of, a load counterbalancing pendulum sensitive to vibrations imparted thereto through its support fulcrum, a weight indicator, an actuator motivated by said pendulum having backlash permitting connection to said indicator for impelling the latter to and away from weight indicating positions, and auxiliary devices for reducing backlash between said actuator and indicator including means to transmit bias to said indicator in a constant direction relative to said actuator and resilient means connected to derive thrust from said actuator and exert said thrust on said transmitting means, said resilient means possessing sufficient stiffness to impel said indicator relative to said actuator and sufficient resilience to absorb indicator vibration involving reaction of said pendulum to said vibration, and adjustable stop means constructed and arranged positively to limit to variable extent the relative movement between said auxiliary device and said actuator.

3. In a weighing scale, the combination defined in claim 2, in which the said actuator and the said auxiliary backlash reducing device are each equipped with gear teeth, and the said indicator is equipped with gear teeth meshing with the teeth of said actuator and meshing simultaneously with the teeth of said device.

4. In a weighing scale a light duty movement multiplying transmission for translating the relatively small displacements of a weighable load counterbalancing mechanism into respectively greater corresponding displacements of a weight indicator embodying the combination with said load counterbalancing mechanism of, pinion teeth connected to actuate the weight indicator, main gear teeth connected to be actuated by the load counterbalancing mechanism meshing with and so cooperatively related in shape and size to said pinion teeth that bind preventing play is present between all intermeshed teeth despite dimensional diversity thereof, auxiliary gear teeth in mesh with said pinion gear teeth having a range of pinion driving movement between spaced positions relative to said main gear teeth, and a spring operatively associating said auxiliary gear teeth and main gear teeth in a manner to urge the former constantly toward a single one of said positions relative to said main gear teeth, whereby one of said auxiliary gear teeth is caused constantly to urge some one of said pinion teeth toward a position to contact with a predetermined side of some one of said main gear teeth, together with stop means establishing said spaced positions at locations displaced in the same direction of rotation from a position of said auxiliary gear teeth in which the latter exactly registers with said main gear teeth.

5. In a weighing scale a light duty movement multiplying transmission for translating the relatively small displacements of a weighable load counterbalancing mechanism into respectively greater corresponding displacements of a weight indicator embodying the combination with said load counterbalancing mechanism of, pinion teeth connected to actuate the weight indicator, main gear teeth connected to be actuated by the load counterbalancing mechanism meshing with and so cooperatively related in shape and size to said pinion teeth that bind preventing play is present between all intermeshed teeth despite dimensional diversity thereof, auxiliary gear teeth in mesh with said pinion gear teeth having a range of pinion driving movement between spaced positions relative to said main gear teeth, and a spring operatively associating said auxiliary gear teeth and main gear teeth in a manner to urge the former constantly toward a single one of said positions relative to said main gear teeth, whereby one of said auxiliary gear teeth is caused constantly to urge some one of said pinion teeth toward a position to contact with a predetermined side of some one of said main gear teeth, together with stop means establishing one of said positions in substantial coincidence with the rotary location of said auxiliary gear teeth when one of the latter said teeth is engaging and causing one of said pinion teeth to contact with one of said main gear teeth.

6. In a weighing scale a light duty movement multiplying transmission for translating the relatively small displacements of a weighable load counterbalancing mechanism into respectively greater corresponding displacements of a weight indicator embodying the combination with said load counterbalancing mechanism of, pinion teeth connected to actuate the weight indicator, main gear teeth connected to be actuated by the load counterbalancing mechanism meshing with and so cooperatively related in shape and size to said pinion teeth that bind preventing play is present between all intermeshed teeth despite dimensional diversity thereof, auxiliary gear teeth in mesh with said pinion gear teeth having a range of pinion driving movement between spaced positions relative to said main gear teeth, a spring operatively associating said auxiliary gear teeth and main gear teeth in a manner to urge the former constantly toward a single one of said positions relative to said main gear teeth, whereby one of said auxiliary gear teeth is caused constantly to urge some one of said pinion teeth toward a position to contact with a predetermined side of some one of said main gear teeth, stop means establishing the first of said positions in substantial coincidence with the rotary location of said auxiliary gear teeth when one of the latter said teeth is engaging and causing one of said pinion teeth to contact with one of said main gear teeth, and additional stop means establishing the other of said positions at a point between said first position and a position in which said auxiliary gear teeth exactly register with said main gear teeth.

7. In a weighing scale, the combination of, a load counterbalancing pendulum sensitive to vibrations imparted thereto through its support fulcrum, a weight indicator, an actuator motivated by said pendulum having backlash permitting connection to said indicator for impelling the latter to and away from weight indicating positions, and auxiliary devices for reducing backlash between said actuator and indicator, including means to transmit bias to said indicator in a constant direction relative to said actuator and resilient means connected to derive thrust from said actuator and exert said thrust on said transmitting means, said resilient means possessing sufficient stiffness to impel said indicator relative to said actuator and sufficient resilience to absorb indicator trembling involving reaction of said pendulum to said vibration, and adjustable stop means constructed and arranged positively to limit to shiftable ranges the extent of relative movement between said auxiliary device and said actuator.

8. In a weighing scale, automatic load counterbalancing and quiver-proof weight indicating mechanism, embodying in combination, a scale frame, a weight indicator pivotally mounted on said frame, a load counterbalancing pendulum pivotally mounted on said frame in a manner to permit relative movement between said pendulum and frame responsive to vibrations derived by said frame from its foundation, pinion teeth connected to actuate the weight indicator, main gear teeth connected to be sensitively responsive to relative movement between said pendulum and frame and progressively movable by said pendulum into meshing contact with successive working faces of said pinion teeth, auxiliary gear teeth corresponding respectively with said main gear teeth movable relatively thereto in successive meshing contact with working faces of said pinion teeth, and a flat spring band having opposite ends thereof fixed in firm relation to said main gear teeth and to said auxiliary gear teeth respectively and flexed yieldingly to maintain at least one main gear tooth and at least one corresponding auxiliary gear tooth in simultaneous contact with respectively different working faces of said pinion teeth thereby to dampen vibrations arising from relative movement between said pendulum and said frame.

9. A composite backlash preventing sector gear for transmitting motion from a load counterbalancing pendulum to an indicator of weight, comprising co-pivotal toothed sector-shaped members flanking each other and respectively having mutually aligned sector shaped apertures, a bowed leaf spring occupying at least one of said apertures, and an anchorage bracket supporting respectively opposite ends of said spring, each of said brackets being fixed respectively on a different one of said members.

10. A composite backlash preventing sector gear as defined in claim 9, together with two angle brackets fixed on arcuately opposite ends respectively of a single one of the said sector-shaped bodies said brackets extending to overhang respectively the arcuately opposite ends of the other of the said sector shaped bodies, and an adjustable stop screw having threaded engagement with each of said brackets and presenting its end into adjustable proximity to the said other sector-shaped body.

OSWALD S. CARLISS.